United States Patent
LaSalle et al.

(10) Patent No.: US 6,322,746 B1
(45) Date of Patent: Nov. 27, 2001

(54) CO-SINTERING OF SIMILAR MATERIALS

(75) Inventors: Jerry C. LaSalle, Montclair; Bryan C. Sherman, Pine Brook, both of NJ (US)

(73) Assignee: Honeywell International, Inc., Morris Township, NJ (US)

( * ) Notice: Subject to any disclaimer, the term of this patent is extended or adjusted under 35 U.S.C. 154(b) by 0 days.

(21) Appl. No.: 09/592,335

(22) Filed: Jun. 13, 2000

Related U.S. Application Data

(60) Provisional application No. 60/139,354, filed on Jun. 15, 1999.

(51) Int. Cl.$^7$ .................................................. B22F 7/00
(52) U.S. Cl. ................................. 419/6; 419/36; 419/38; 264/645
(58) Field of Search .................................. 419/6, 36, 38; 264/645

(56) References Cited

U.S. PATENT DOCUMENTS

| | | | |
|---|---|---|---|
| 3,889,349 | * | 6/1975 | Kaufman . |
| 3,982,778 | * | 9/1976 | Spencer et al. . |
| 4,029,476 | * | 6/1977 | Knopp . |
| 4,076,561 | * | 2/1978 | Lee et al. . |
| 4,236,923 | * | 12/1980 | Takahashi et al. . |
| 4,419,413 | * | 12/1983 | Ebihara . |
| 4,472,350 | * | 9/1984 | Urano ........................ 419/6 |
| 4,734,237 | * | 3/1988 | Fanelli et al. ............... 264/122 |
| 4,839,138 | * | 6/1989 | Fitz ............................ 419/6 |
| 4,881,431 | * | 11/1989 | Bieneck . |
| 5,094,810 | * | 3/1992 | Shira ........................... 419/6 |
| 5,286,767 | | 2/1994 | Rohrbach et al. ........... 524/27 |
| 5,482,671 | * | 1/1996 | Weber .......................... 419/36 |
| 5,554,338 | * | 9/1996 | Sugihara et al. ............ 419/5 |
| 5,574,957 | * | 11/1996 | Barnard et al. ............. 419/67 |
| 5,665,014 | | 9/1997 | Sanford et al. ............. 473/345 |
| 5,669,825 | | 9/1997 | Shira ........................... 473/324 |
| 5,722,032 | * | 2/1998 | Gay ............................ 419/6 |
| 5,864,955 | * | 2/1999 | Hirai .......................... 30/350 |
| 5,993,733 | * | 11/1999 | Kawai ......................... 419/48 |

FOREIGN PATENT DOCUMENTS

| | | | |
|---|---|---|---|
| WO 97 38811 A | 10/1997 | (GB) | ............... B22F/3/22 |
| 08260005 A | * 10/1996 | (JP) . | |

OTHER PUBLICATIONS

English Abstract (JP 08 025151 A).
English Abstract (JP 03 039405 A).

* cited by examiner

*Primary Examiner*—Ngoclan Mai
(74) *Attorney, Agent, or Firm*—Roger H. Criss

(57) ABSTRACT

Molded green parts are fused together to form a bond or joint during the sintering process. The molded green parts are held in intimate contact with each other and sintered at temperatures sufficient to fuse the parts together. The process may entail dry fusing of part-to-part or it may include the use of a flux between the parts being fused together to enhance the bond.

10 Claims, No Drawings

CO-SINTERING OF SIMILAR MATERIALS

CROSS-REFERENCE TO RELATED APPLICATIONS

This application claims the priority of U.S. provisional application Ser. No. 60/139,354, filed Jun. 15, 1999.

FIELD OF THE INVENTION

This invention relates to a process by which two molded "green" parts are permanently fused together to form a bond or joint during the sintering process.

BACKGROUND OF THE INVENTION

Heretofore, complex-shaped parts made from metal powders were completely formed by an appropriate forming process such as, for example, investment casting or machining. An alternative method is the metal injection molding process. Metal-injection-molding (MIM) is recognized as a premier forming method for complex shapes. It affords significant advantages over other forming methods, by being capable of rapidly producing net shape, complex parts in high volume. Initially, MIM comprised the step of mixing metal powder with a dispersant and a thermoplastic organic binder of variable composition. The molten powder/binder mixture was heated during the injection molding process and injected into a relatively cold mold. After solidification, the part was ejected in a manner similar to plastic parts. Subsequently, the binder was removed and the part was densified by a high temperature heat treatment. There were a number of critical stages in this process, which included the initial mixing of the powder and binder, the injection of the mixture into the mold, and the removal of the organic matrix material. One of the main disadvantages of the inital MIM process is the removal of the organic vehicle. At present, with the MIM process the cross section limit for fine particle sizes is 0.5–0.75 inch (12.7–19.05 mm). If the particle sizes exceed that limit, the binder removal process will lead to defects, pinholes, cracks, blisters etc. Binder removal takes place by slow heat treatment processes that can take up to several weeks. During debinding at elevated temperatures, the binder becomes a liquid, which can result in distortion of the green part due to capillary forces. Another disadvantage of the initial MIM process is the tendency for the relatively high molecular weight organic material to decompose throughout the green body, causing internal or external defects. The use of solvent extraction, wherein a part of the organic material is removed using an organic or supercritical liquid, sometimes minimizes defect formation. Solvent extraction encounters difficulties because the remainder still needs to be removed at elevated temperatures. However, the solvent exaction process allows for the formation of porosity throughout the part, with the result that removal of the remaining organic is facilitated. During binder removal, part slumping can pose problem, especially for the larger particle sizes if the green density/strength is not high enough.

As such, MIM offers certain advantages for high volume automation of net shape, high dimensional control and complex parts, but the limitation of part size and the very long binder removal times combined with their environmental impact has not resulted in the expected growth of the use of this technique.

Some improvements, such as the use of water based binder systems, have been made to the initial PIM process. Hens et al. developed a water leachable binder system [U.S. Pat. No. 5,332,5373]. The injection molding feedstock is made with a tailored particle size distribution (to control the rheology); a PVA based majority binder, and a coating on each of tee binder particles. During molding, these coatings form necks that give the part rigidity. After injection molding, there is a water debind that lasts several hours. After the remaining binder is cross-linked by either UV or chemical methods, the part undergoes a thermal debind, which takes 8–12 hours for a part such as a golf club head. Other aqueous-based binders contain either polyethylene glycols, PVA copolymers, or COOH-containing polymers. A polyacetal-based system also has been developed that is molded at moderately high temperatures, after which the binder is removed by a heat treatment with gaseous formic or nitric acid. The low temperature excludes the formation of a liquid phase and thus distortion of the green part due to viscous flow. The gaseous catalyst does not penetrate the polymer and the decomposition only takes place at the interface of the gas and binder, thereby preventing the formation of internal defects. These improvements are limited by the requirement for separate binder removal furnaces and relatively long times, depending on the part size. There are environmental issues as well with removal of the large amount of wax/polymer in the form of fire hazards and volatile organic compound discharge.

Honeywell International Inc. has developed an injection molding process using agar as an aqueous binder (e.g., U.S. Pat. No. 4,734,237 to Fanelli et al., the disclosure of which is expressly incorporated herein by reference). In this patent, this binder system is applied to both ceramic and metal powders. The use of agarose or derivatives of polysaccharide aqueous gels are also included. The advantage over state-of-the-art wax-based technology is the use of water as the fluid medium versus wax. In such feedstocks, water serves the role of the fluid medium in the aqueous injection molding process, comprising roughly 50 vol % of the composition, and agar provides the "setting" function for the molded part. The agar sets up a gel network with open channels in the part, allowing easy removal of the water by evaporation. The agar is eventually removed thermally; however, it comprises less than 5 volume fraction of the total formation.

The lack of a debind requirement makes these parts particularly suitable for co-sintering. In the co-sintering process, a component which has multiple portions that may vary in dimensions and shape can be more easily fabricated by joining two easily designed parts during sintering rather than completely molding one more complicated design. Instead of designing a separate mold for each different dimensional variation and shape, and then manufacturing each part separately, it has been found to be advantageous to manufacture distinct portions of a complex part separately and fuse or bond the portions together to form the final desired part. This also allows part production flexibility, since a base portion can be molded and stored green in large quantities while several adjunct parts of different designs can be molded on an as-needed basis. The work-in-progress can be reduced, facilitating just-in-time delivery.

Among the problems associated with achieving this result have been the quality of the bond or the overall strength of the joint. Approaching the strength of an integrally formed molded part has proven to be difficult to achieve. Accordingly, it would be desirable to provide a method for joining similar materials which avoided the above-mentioned problems.

SUMMARY OF THE INVENTION

The present invention provides a method for co-sintering and permanently fusing together two molded green parts from a powder to form a bond or joint therebetween, comprising the steps of molding at least two parts in a green state and sintering the parts at an appropriate temperature while holding the parts in intimate contact to fuse the parts together. The process may entail "dry" material-to-material fusing, or it may include the use of a flux between the two materials being fused together to enhance the bond.

A typical co-sintering cycle for a 17-4PH stainless steel as-molded part is as follows: the green part is heated in air at approximately 280 C. for 1 hour at the beginning of the sintering cycle, commonly known as the debind portion of the cycle. This step pyrolizes the binder, allowing the carbon to be removed during the sintering cycle. The sintering portion of the cycle is typically done in the hydrogen or vacuum environment depending on the alloy. Sintering temperatures in the range of about 1300 to about 1400° C. are typically employed for stainless steel alloys.

DETAILED DESCRIPTION OF THE INVENTION

The parts to be co-sintered in accordance with this invention may be formed from a metal or ceramic powder injection molding composition which has been injection molded to the desired form in the "green" state. Such compositions typically include a metal or ceramic powder or mixtures thereof, a gel-forming material such as agar, agarose or a mixture thereof (generally referred to as an agaroid), and a liquid carrier (preferably water). The term "metal" as used herein includes pure metals, alloys, intermetallic compounds and mixtures thereof. The term "ceramic" as used herein is intended to include, without limitation, powders of such materials as oxides, borides, nitrides, silicides, and carbides of metal, nonmetals or mixtures thereof, and mixtures of such materials. The composition also preferably includes a gel-strength enhancing agent, such as a borate of calcium, magnesium, zinc or mixtures thereof. Other additives that may be present in the composition include coupling agents, dispersants, lubricants and biocides.

The present invention can be better understood with reference to a golf club putter head, which is typically manufactured by investment casting of the entire head in a mold. After molding the head, the green part must be sintered according to a specific schedule for that material in order to obtain the final desired density and other physical properties. However, the front and back faces of a typical manufacturer's line of putters often vary in dimensions and shape. According to the present invention, various configurations of front and back faces can be separately manufactured from powder metal alloys such as, for example, stainless steel alloys (e.g., 316L, 410 and 17-4PH stainless steel alloys). These parts are formed by injection molding of a metal powder composition comprising the metal powder, a gel forming material (preferably agar) and a liquid carrier (preferably water). The result are parts which are in the "green" state and are near net shape.

Depending on the desired configuration of the final putter head, a particular front face configuration can be fused by co-sintering to a particular back face configuration resulting in the final putter head. In this way, inventories of finished putter heads can be kept to a minimum resulting in overall inventory savings. The parts may be sintered together in a dry condition or through the use of a flux, such as a nickel or copper flux. It should be apparent that other parts can similarly be produced.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

This example describes an experimental bonding of two parts during the sintering process in the "dry" condition (without the addition of flux between the parts). Two pieces of green stainless steel alloy powder molded parts made from a molding compound comprising 17-4PH stainless steel powder, agar and water as the main ingredients, were co-sintered to form a joint. This joint was created at the interface where direct, intimate contact occurred allowing the developing grain pattern of the sintering materials to "cross over" the boundary between the parts and develop into one homogeneous part forming a durable joint. Strength of the bond was in the range of approximately 30% of the base material strength. Table I shows the properties of the "dry co-sinter" example.

TABLE 1

|  | UTS (ksi) | Young's Modulus (ksi) |
|---|---|---|
| Tensile Sample | | |
| 1 | 33.037 | 819 |
| 2 | 38.685 | 759 |
| 3 | 41.219 | 855 |
| 3 Pt. Bend Sample | | |
| 1 | 67.586 | 8360 |
| 2 | 87.387 | 7703 |

The above example demonstrates that the bond created by the dry co-sintering process of the present invention produces a joint having acceptable strength and durability characteristics.

EXAMPLE 2

This example describes an experimental bonding of two parts during the sintering process using a flux or filler material at the joint surface to provide a more homogeneous and consistent bond between the parts. It was found that the "dry" joint would form well if adequate contact surface was consistently provided, but that some variability was inherent in the "dry" process. By using a flux or filler this variability was decreased by allowing greater surface contact by means of the flux or filler between the parts during the sintering process. Two pieces of green stainless steel alloy powder molded parts were co-sintered using nickel flux at the interface to form the joint. The joint created using the nickel flux exhibited a more even and consistent bond. The data on the bond strength in Table 2 confirms that a more consistent bond was created using the nickel flux. The strength of this bond was found to be as high as 75% of the base material strength as a result of the increased surface contact created with the flux.

TABLE 2

|  | UTS (ksi) | Young's Modulus (ksi) |
|---|---|---|
| Tensile Sample | | |
| 1 | 40.104 | 899 |
| 2 | 37.393 | 891 |

TABLE 2-continued

|   | UTS (ksi) | Young's Modulus (ksi) |
|---|---|---|
| 3 | 96.428 | 2000 |
| 4 | 123.179 | 2555 |
| 3 Pt. Bend Sample | | |
| 1 | 65.187 | 9225 |
| 2 | 73.715 | 9440 |

This example likewise demonstrates that the bond created by the co-sintering process according to the present invention using a flux between the parts produces a joint having acceptable strength and durability characteristics.

EXAMPLE 3

This example illustrates the production of a relatively large hollow component using the co-sintering process of the present invention. An air intake manifold having a separately molded flat top and a base, roughly shaped as a bowl, was produced using the present co-sintering process. Since it would be difficult to form a large enclosed cavity by injection molding, the top was molded separately from the bowl, and the parts were joined during sintering by placing the top on the sintering plate and the bowl onto the top. In this way, the weight of the bowl caused good contact during the sintering cycle, resulting in a successfully joined component having an internal cavity.

While the present invention has been particularly shown and described with reference to preferred embodiments, it will be readily appreciated by those of ordinary skill in the art that various changes and modifications may be made thereto without departing from the spirit and scope of the invention. It is intended that the claims be interpreted to cover the disclosed embodiments, those alternatives which have been discussed above and all equivalents thereto.

We claim:

1. A method for co-sintering and permanently fusing together molded green parts formed from a powder injection molding composition to form a bond or joint therebetween comprising the steps of:

a) molding at least two parts in a green state, wherein a nickel-based flux is disposed between said molded green parts in order to form a bond therebetween; and b) sintering the parts at an appropriate temperature while holding the parts in intimate contact to fuse the parts together.

2. The method of claim 1, wherein said powder injection molding composition comprises a metal powder, a ceramic powder or mixtures thereof.

3. The method of claim 2, wherein said powder injection molding composition comprises said powder, a gel-forming material and a liquid carrier.

4. The method of claim 3, wherein said gel-forming material is an agaroid and said liquid carrier is water.

5. The method of claim 1, wherein said powder is a metal powder.

6. The method of claim 5, wherein said metal is stainless steel.

7. The method of claim 6, wherein said stainless steel is an alloy selected from the group comprising 316L, 410 and 17-4PH.

8. The method of claim 1, wherein said powder is a ceramic powder.

9. The method of claim 1, wherein said parts comprise a front face of a golf club putter head and a back face of a golf club putter head.

10. The method of claim 1, wherein said sintering temperature is between about 1300 to about 1400° C.

* * * * *